July 30, 1957 D. L. JAFFE ET AL 2,801,341

OSCILLATOR

Filed Jan. 24, 1956

INVENTORS:
DAVID L. JAFFE &
ROBERT M. SPIEGEL,

BY Harry M. Saragovitz
ATTORNEY

United States Patent Office
2,801,341
Patented July 30, 1957

2,801,341

OSCILLATOR

David L. Jaffe, Great Neck, N. Y., and Robert M. Spiegel, Philadelphia, Pa., assignors to the United States of America as represented by the Secretary of the Army Application January 24, 1956, Serial No. 561,167
3 Claims. (Cl. 250—36)

This invention relates generally to an oscillator circuit and more particularly to a frequency controlled oscillator.

An object of the present invention is to provide a stable frequency controlled oscillator which effectively operates over various frequency bands.

Another object is to provide a saturable reactor controlled oscillator which remains stable under varying external conditions and is less sensitive to disturbances.

Other objects, features and advantages of this invention will suggest themselves to those skilled in the art and will become apparent from the following description of the invention taken in connection with the accompanying drawings in which.

A frequency controlled oscillator which has the control frequency applied to a winding of a saturable reactor is limited in stability by the susceptibility of the reactor to changes due to ambient temperature, humidity, magnetization, control current fluctuations, stray magnetic fields, hum, etc. A saturable reactor that has a potential frequency range greater than that required for a particular application is greatly improved in stability by loading the reactor winding with a stable fixed inductor connected in series or in parallel with the reactor. Since this loading requires an increase in the modulation level applied to the control winding, the effect of hum and random fluctuation levels or other disturbances are minimized. Further, the reactor being under-load is less affected by external disturbance since the effect of disturbance is related to the ratio of loading. Where a frequency control oscillator is utilized for several bands or ranges, involving different percentage deviations for each band, small disturbances and fluctuations might seriously distort the modulation depending upon the selected band. With this invention it is possible and convenient to employ a tapped loading coil in which an appropriate degree of loading is selected for each range. In this manner the same nominal control signal amplitude can be maintained for all ranges thus providing the same degree of stability over each range which simplifies the control signal circuit by limiting the control to a small dynamic range of information.

Figure 1:
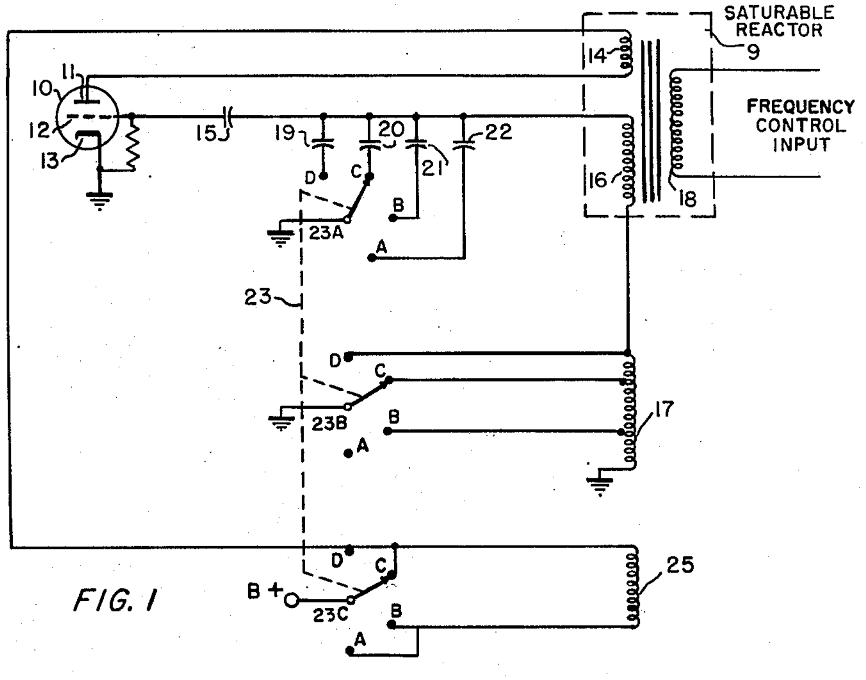
Figure 1 is a schematic diagram of a first embodiment of a control oscillator circuit embodying the principles of this invention.

Referring to the schematic diagram of Figure 1, there is shown a first embodiment of the invention in the form of a frequency controlled tuned grid oscillator including vacuum tube 10 having an anode 11, control grid 12 and cathode 13. Anode 11 is connected thru the tickler feedback winding 14, auxiliary feed back winding 25 to the positive terminal of a suitable source of potential designated B+. The negative terminal of the voltage source, not shown, is grounded. Cathode 13 is also grounded. Grid 12 is coupled to frequency determining winding 16 thru coupling capacitor 15. Winding 16 is connected to stabilizing inductance 17. The control frequency is applied to an additional winding 18. The oscillation frequency determining winding 16, the tickler feedback winding 14 and the frequency control winding 18 are magnetically coupled in saturable reactor 9.

Range or band switch 23 has sections *23a*, *23b* and *23c* which are ganged in a conventional manner so that the contacts on each section are simultaneously contacting similarly lettered positions. Switch section *23a* provides an appropriate capacitance in parallel with the series combination of frequency determining inductances to provide the central frequency for each range. Switch section *23b* selects an appropriate portion of inductance 17 (from full inductance in position A to no inductance in position D) for series connection with winding 16. Switch section *23c* includes the auxiliary feedback winding 25 in series with winding 14 in the A and B ranges. This is required to maintain the ratio of frequency determining inductance to feedback winding inductance with the desired limits. Thus, in each position of the range switch the particular frequency determining capacitor is connected in the circuit. Additionally, a preselected load inductance is included in the reactor circuit to provide proper loading at that frequency to minimize the effect of disturbance and to stabilize the oscillator in the vicinity of the control frequency.

Figure 2:
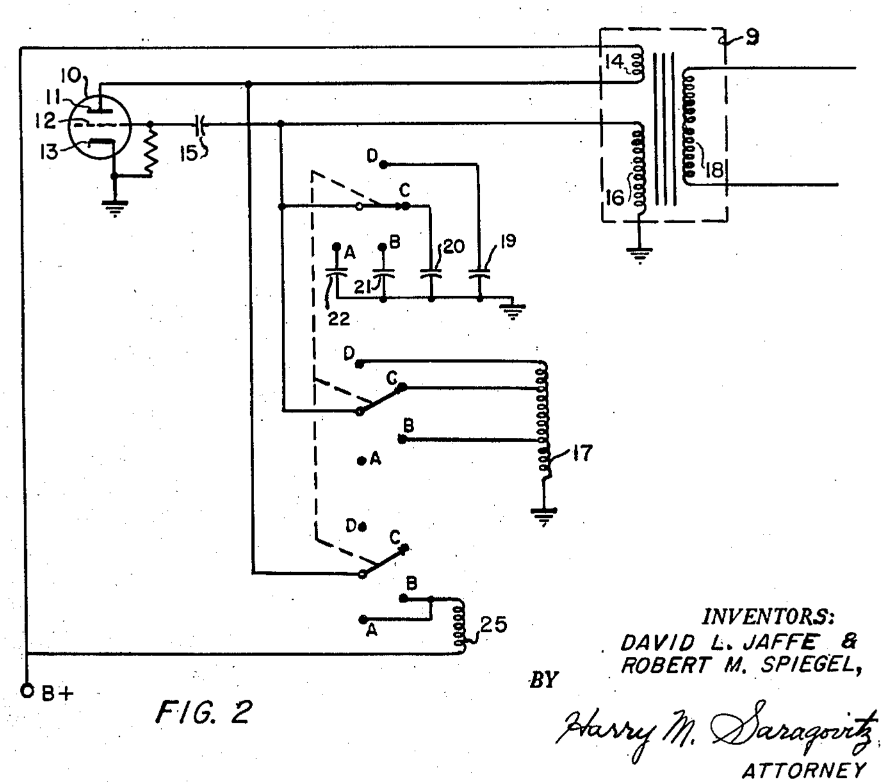
Figure 2 is a schematic diagram of a second embodiment of the oscillator particularly adapted for high frequency applications.

The operation of the circuit in the embodiment shown in Figure 2 is similar to that described for the embodiment shown in Figure 1 where the like reference numerals indicate similar elements. Instead of the stabilizing winding 17 being included in series with the frequency control winding 16 as in Figure 1, the winding 17 is connected in parallel with the winding 16. This circuit is adapted for high frequency applications.

While there has been described hereinabove what is at present considered to be a preferred embodiment of this invention, it will be obvious to those skilled in the art that various changes and modifications may be made therein without departing from the true spirit and scope of the invention.

What is claimed is:

1. A frequency controlled oscillator comprising a vacuum tube having an anode; a cathode and a control grid; a saturable reactor having a main frequency determining winding coupled to the control grid, a main feedback winding coupled to the anode and a frequency control winding; switch means including a plurality of ganged sections, the first switch section adapted to include various capacitors in the grid circuit for varying the oscillation frequency, the second switch section for including a selected portion of an auxiliary frequency determining winding in circuit with said main frequency determining winding for stabilizing the oscillations, the third switch section for connecting an auxiliary feedback winding to said main feedback winding in selected switch positions.

2. A frequency controlled oscillator according to claim 1 wherein said auxiliary frequency determining winding is included in series with said main frequency determining winding.

3. A frequency controlled oscillator according to claim 1 wherein said auxiliary frequency determining winding is included in parallel with said main frequency determining winding.

References Cited in the file of this patent

UNITED STATES PATENTS

| | | |
|---|---|---|
| 2,382,615 | Donley | Aug. 14, 1945 |
| 2,531,312 | Van Loon | Nov. 21, 1950 |
| 2,758,207 | Parzen | Aug. 7, 1956 |